United States Patent [19]
Shafe'

[11] Patent Number: 6,035,429
[45] Date of Patent: *Mar. 7, 2000

[54] ELECTRONIC CIRCUIT IMPLEMENTING COMPONENT LEVEL DISK DRIVE

[75] Inventor: Mathew Kayhan Shafe', Campbell, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/784,507

[22] Filed: Jan. 17, 1997

Related U.S. Application Data

[63] Continuation of application No. 08/363,462, Dec. 23, 1994, abandoned.

[51] Int. Cl.[7] ............................................... G06F 11/00
[52] U.S. Cl. ................................. 714/718; 365/201
[58] Field of Search ........................ 371/21.1, 21.2, 371/25.1; 360/99.01, 99.12, 97.01; 361/683, 686, 684, 737; 714/5, 7, 25, 30, 40, 47, 42, 725, 733, 763, 770, 718; 365/201

[56] References Cited

U.S. PATENT DOCUMENTS

| | | | |
|---|---|---|---|
| 5,377,060 | 12/1994 | Nigam | 360/99.01 |
| 5,432,748 | 7/1995 | Hsu et al. | 365/230.01 |
| 5,488,523 | 1/1996 | Seaver et al. | 360/99.12 |
| 5,502,604 | 3/1996 | Furay | 360/97.01 |
| 5,502,617 | 3/1996 | Tsukada et al. | 361/686 |

FOREIGN PATENT DOCUMENTS

| | | | |
|---|---|---|---|
| 419022 | 8/1990 | European Pat. Off. | G11B 33/12 |
| 475049 | 7/1991 | European Pat. Off. | G06F 1/18 |
| 509330 | 4/1992 | European Pat. Off. | G11B 33/00 |
| 597186 | 3/1994 | European Pat. Off. | G11B 25/04 |
| 62-270089 | 11/1987 | Japan | G11B 25/04 |
| 4-291079 | 10/1992 | Japan | G11B 33/02 |
| WO94/09486 | 4/1994 | WIPO | G11B 5/012 |
| WO94/29866 | 12/1994 | WIPO | G11B 25/04 |

OTHER PUBLICATIONS

IBM TDB, vol. 35, No. 6, Nov., 1992, "Assembly Method for Direct–Access Storage Device VLSI", Nov., 1992.
U.S. Patent Application Serial No. 08/363,463, "One–Sided, Single Platter Hard Disk With Center Parking Features".
U.S. Patent Application Serial No. 08/363,464, "Reconfigurable Interface for Small Disk Drives".
IBM TDB, vol. 35, No. 6, Nov. 1992, "Assembly Method for Direct–Access Storage Device VLSI".

*Primary Examiner*—Robert W. Beausoliel, Jr.
*Assistant Examiner*—Nadeem Iqbal
*Attorney, Agent, or Firm*—Ingrid M. Foerster; Monica D. Lee; Randall J. Bluestone

[57] ABSTRACT

An electronic circuit apparatus is provided comprising a component disk drive, and an electronic circuit implementing the component drive for local storage as an alternative to costlier solid state memory, wherein the electronic circuit has at least one function not related to the operation of the component disk drive, and wherein the electronic circuit uses information stored on the component disk drive to perform the non-storage related function. The apparatus is suitable for a plurality of electronic devices and for electronic circuit applications residing in a card enclosure adapted for plugging into an electronic device or computer. In the preferred embodiment, the component disk drive comprises a disk with a single recording surface mounted directly to a flat motor, a low profile actuator assembly including a single suspension supporting an MR head, and means for "parking" the head at the center of the disk. The preferred electronic circuit apparatus is enclosed in a PCM-CIA type II or III card wherein the component disk drive occupies no more than 50% of the card area, and the remaining card area is populated by electronic components including nonstorage functions.

55 Claims, 8 Drawing Sheets

ELECTRONIC CIRCUIT IMPLEMENTING
COMPONENT LEVEL DISK DRIVE

This application is a continuation of Ser. No. 08/362,462 filed Dec. 23, 1994 now abandoned.

FIELD OF THE INVENTION

The present invention relates generally to electronic devices implementing local storage, and in particular to an electronic circuit that incorporates a component level disk drive in lieu of costlier solid state memory.

BACKGROUND OF THE INVENTION

Solid state memory is a standard component of computer systems and of many electronic devices, providing local storage to the electronic circuit that incorporates it. Some examples of solid state memory components are flash EPROM (erasable, programmable read-only memory), SRAM (static random access memory), and DRAM (dynamic random access memory). One useful function of local memory is to hold small amounts of microcode to be used, for example, for programming programmable circuit components, or for running basic assurance tests (BATS) on other the circuit components. Another useful function of local memory is to store user information, e.g. local storage is used by a pager to store telephone numbers and messages, by a fax machine to store communication protocol parameters, by a printer to store fonts, and so on. For reliability and flexibility, the solid state memory used in such applications is non-volatile and modifiable, e.g. SRAM.

Unfortunately, the cost of solid state memory increases almost linearly with its storage capacity. Moreover, since there are physical limitations to known solid state technologies, an increase in the storage capacity of memory corresponds to an increase in its physical size. These limitations present a foreseeable problem with the growing demand for small, sophisticated, portable, and inexpensive devices with substantial storage requirements.

One area in which the limitations of solid state memory are becoming apparent is card-based electronic circuits. For example, circuits embodying or controlling fax machines, modems, cellular phones, printers, cameras, disk drives, and other devices are presently being housed in credit-card sized formats of predefined dimensions that plug into a compatible socket of a laptop computer, PC, or other electronic device. Three standard formats that have emerged for such credit-card-type applications are the PCMCIA formats. A "type III" card measures 10.5 mm in height, 5.6 mm in length and 54 mm in width. The dimensions of a "type II" card are approximately 3.3 mm high×85.6 mm long×54 mm wide. A "type I" card is a modest 2.5 mm high×85.6 mm long×54 mm wide.

In contrast to solid state memories, magnetic disk drives in general are becoming smaller, and their cost per megabyte is decreasing. It is therefore advantageous to provide a magnetic disk drive small enough to replace solid state memory in electronic devices, such as printers, and in card-based electronic circuits, e.g. PCMCIA formats. Furthermore, magnetic disk drives are ideal for many of the applications discussed above because they provide modifiable, high density, nonvolatile storage.

Until recently, however, magnetic storage devices have been large too incorporate directly into an application circuit such as those implemented in PCMCIA type card enclosures. Rather, drives have traditionally been peripheral devices communicating with the application through a peripheral interface. Moreover, removable, card-based electronic circuits and many electronic devices in general must remain operational after being dropped or otherwise exposed to external shock. Previous disk drives were unable to withstand large amounts of external shock without suffering damage, because the shock caused the read/write heads and suspensions to slam into the magnetic recording surfaces.

Recently, a number of small disk drives have become available on the market approaching a component-sized storage device. For example, Hewlett Packard offers a 20–40 MB 1.3" KittyHawk drive. In addition, component type drives are disclosed in U.S. Pat. No. 5,264,975, Japanese application nos. 62-270089, 04-291079, and Japanese publication no. 01112586. However, none of these references discusses an architecture for implementing a disk drive as local storage within an electronic circuit, wherein the circuit performs functions unrelated to the operation of the disk drive itself, e.g. a circuit wherein the disk drive stores microcode for use in the operation of the circuit, or wherein messages received by the circuit are stored in the disk drive.

SUMMARY OF THE INVENTION

A primary object of the present invention is to provide an electronic circuit implementing a discrete, component-type disk drive in lieu of solid state memory for local storage requirements, wherein the electronic circuit uses information stored on the component drive to perform functions unrelated to the operation of the disk drive.

A further object of the present invention is to provide an electronic circuit in a card enclosure, e.g. a PCMCIA type II or III card, and including therein a low profile component sized drive having a footprint of less than 50% of the card area, and good resistance to external shock.

Another object of the present invention is to provide an electric circuit implementing a component disk drive for locally storing basic assurance tests.

A further object of the present invention is to provide an electronic circuit, including a programmable logic unit (PLU), and implementing a component disk drive for locally storing the microcode used to program the PLU.

Yet another object of the present invention is to provide an electronic messaging device including a component disk drive for storing messages, images, documents, videos and other user information.

Accordingly, the present invention is an electronic circuit apparatus comprising an electronic circuit implementing a discrete, component sized disk drive in lieu of solid state memory for locally storing information to be used by said circuit in performing one or more functions not related to the operation of the disk drive. In the preferred embodiment, the disk drive comprises a single disk with a diameter of no more than 1.3 inches and a single recording surface, mounted directly to a rotatable flat motor having a diameter of up to 1.3 inches. The component drive further comprises a single suspension carrying at least one transducer for writing and retrieving data from the disk, and a parking zone at the center of the recording surface for high shock resistance.

In a first specific embodiment of the proposed apparatus, an electronic circuit including a component disk drive is provided wherein the disk drive stores microcode for use in the operation of the circuit. In another specific embodiment, an electronic circuit including a component disk drive is provided wherein the disk drive stores user information such as telephone numbers and messages.

BRIEF DESCRIPTION OF THE DRAWING

The foregoing and other objects, features and advantages of the present invention will be apparent from the following detailed description of the preferred embodiments of the invention, and from the accompanying figures of the drawing.

DESCRIPTION OF THE PREFERRED EMBODIMENT

Figure 1:
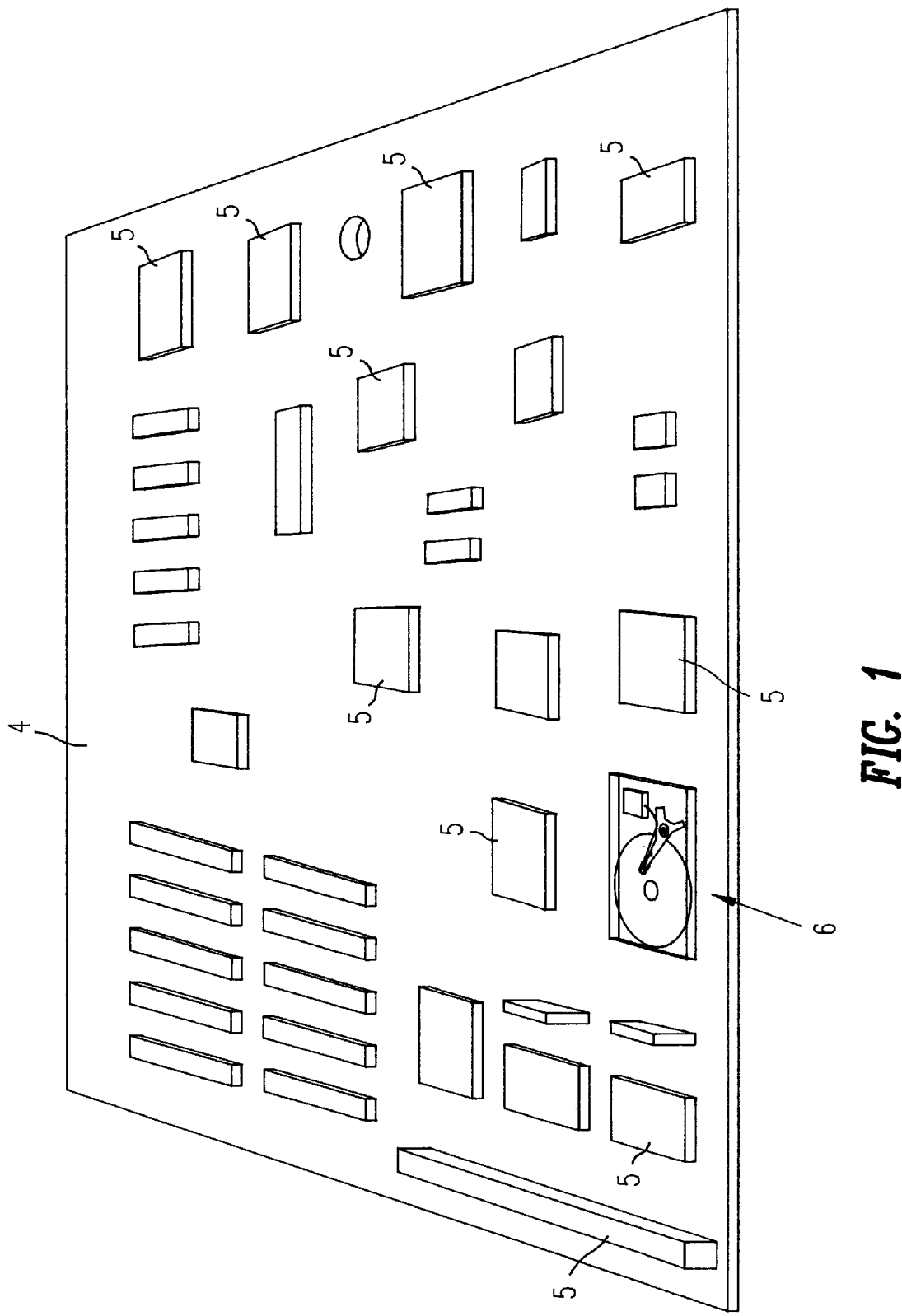
FIG. 1 is a circuit board including a discrete component sized disk drive for local storage requirements according to the present invention.

The present invention will now be described with reference to FIG. 1, illustrating a general electronic circuit board 4 representative of circuit boards found in a variety of electronic devices. It includes a plurality of interconnected circuit elements 5 such as solid state components, resistors, capacitors, oscillators, and so forth. The solid state components comprise, for example, a microprocessor, memory, an arithmetic logic unit, a programmable logic unit, etc. The interconnected elements are referred to collectively as the electronic circuit. The electronic circuit also includes a discrete, component-sized disk drive 6 according to the present invention for providing local storage to one or more of the circuit elements 5.

A circuit board such as that represented in FIG. 1 may reside, for example, in a personal computer, a laptop, or other computing device. It may also reside in devices peripheral to a computing device, e.g. controller cards for larger disk drives, printers, modems, fax-modems, and servers. A circuit board is often present in electronic devices such as video cameras, fax machines, cellular phones, electronic pagers, photocopiers, and remote control devices. All of these are likely to have electronic circuits with some local storage requirements.

Figure 2A:
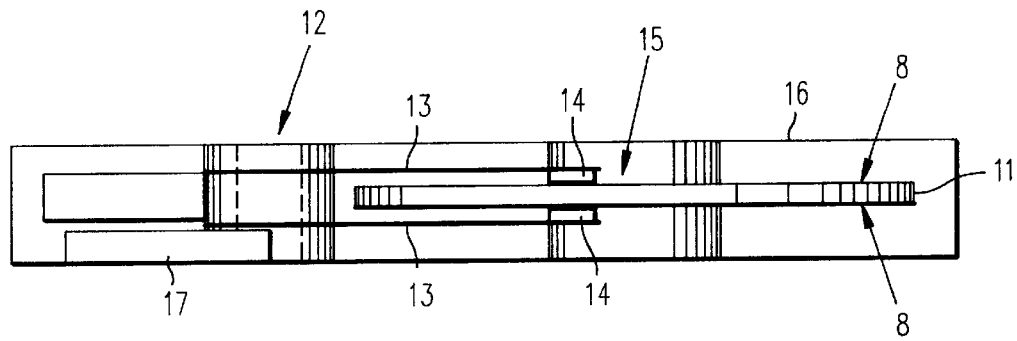
FIGS. 2(a) and 2(b) show a known disk drive including two recording surfaces and two suspensions.
Figure 2B:
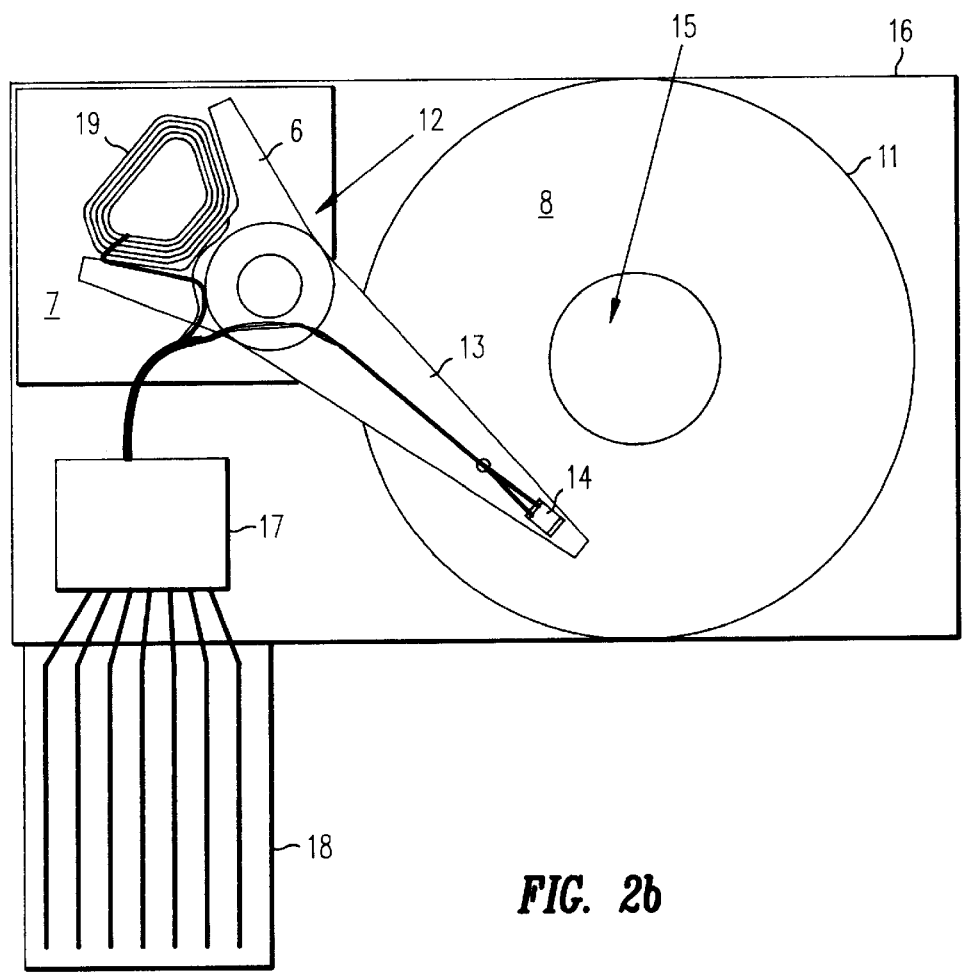

FIGS. 2(a) and 2(b) show side and top views of a general, presently known disk drive comprising a disk or platter 11 connected to a hub 15, a motor (not shown), an actuator assembly 12, arm electronics 17, and a housing 16. The disk 11 includes a pair of recording surfaces 8,9. The actuator assembly 12 generally comprises a voice coil motor (VCM), an actuator arm 6, and a pair of suspensions 13 connected to the arm 6 and supporting a pair of air bearing sliders 14 over respective recording surfaces 8,9 of the disk 11. One or more transducers or read/write heads are located on each slider 14, and are held in close proximity to the disk surface by the combination of a downward force (relative to the disk surface) from the suspension 13 and an upward force caused by air flow generated from the rotation of the disk 11. If the downward force exceeds the upward force, the slider will come into contact with the disk surface.

The VCM comprises an inductive coil 19 disposed between an upper magnet (not shown) and a lower magnetic plate 7. The arm electronics 17 transmits electrical positioning current to the coil 19. The current signal induces a magnetic flux around the coil for repulsing and attracting the magnet and magnetic plate 7. The repulsing and attracting forces provide movement of the actuator arm in a plane substantially parallel to those of the disk recording surfaces, causing the suspensions 13 to move along an arcuate path over respective surfaces 8,9.

Data is generally recorded on concentric tracks of the recording surfaces 8,9. The disk region or track having the largest diameter is referred to as the outer diameter (OD) of the disk, and the region or track nearest to the hub and having the smallest diameter is referred to as the inner diameter (ID). Data to be stored on the disk 11 is first "encoded" by a read/write channel (not shown) ordinarily residing external to the disk drive housing 16. The data is encoded into a form suitable for the storage medium, then transmitted via the arm electronics 17 to the transducer for writing to the disk. For example, in a magnetic disk drive, digital data is encoded into a series of pulses. As is known in the art, the pulses are transmitted in the form of a current to the transducer, and cause a fluctuating magnetic field at the transducer pole tip that affects the magnetization of discrete regions on the disk surface. When a transducer senses or "reads" information from the disk, the data is transmitted in encoded form via the arm electronics 17 to the channel for "decoding". The arm electronics usually include means for amplifying and synchronizing the read signal.

The hub 15 is fixedly attached to the disk 11 and encases a motor (not shown) for providing a rotational force. The rotational force is translated to the hub 15 and from the hub 15 to the disk 11. The hub encloses a motor shaft and generally protrudes from the upper surface of the disk as shown in FIG. 1A, preventing the suspension/head assembly from access to the region at the center of the disk. To protect a rotary disk drive from external forces during operation or movement, means may be implemented to park the head when the disk is not operating and/or during periods of inactivity (i.e. times when data is not being written to or retrieved from the disk).

FIGS. 3(a)–3(d) show the preferred embodiment of the component disk drive implemented in the electronic circuit apparatus of the present invention. The drive comprises a disk 11, a motor 44, an actuator assembly 12, arm electronics 17, and a housing 16. The disk 11 is preferably magnetic and includes one recording surface 42 with a substantially planar region 45 at its center. It is preferably mounted directly to a flat motor 44 along its nonrecording surface by some appropriate means, e.g. mechanically, or by applying a bonding agent along interface 43. Use of a single recording surface and direct platter mounting allows a wider, thinner motor assembly to be used than would be feasible for a disk having two recording surfaces. The diameter of the motor 44 may be as large or larger than the diameter of the disk 11 itself. The advantages of this type of motor 44 will be described in further detail below.

The actuator assembly comprises a voice coil motor, an actuator arm 6, a single suspension 13 and a transducer-bearing slider 14. Preferably, the slider carries a magnetoresistive (MR) head for greater data capacity. Magnetoresistive heads are known in the disk drive industry and are preferred because their high sensitivity enables greater areal density (i.e. bits per inch) than conventional inductive heads. Using a state of the art magnetoresistive head in the preferred embodiment provides useful data storage capacity for applications requiring moderate data storage. However, it will be understood that other types of transducers may also be implemented. Moreover, the invention may easily be adapted for a plurality of heads per slider and a plurality of sliders on suspension 13.

Figure 3A:
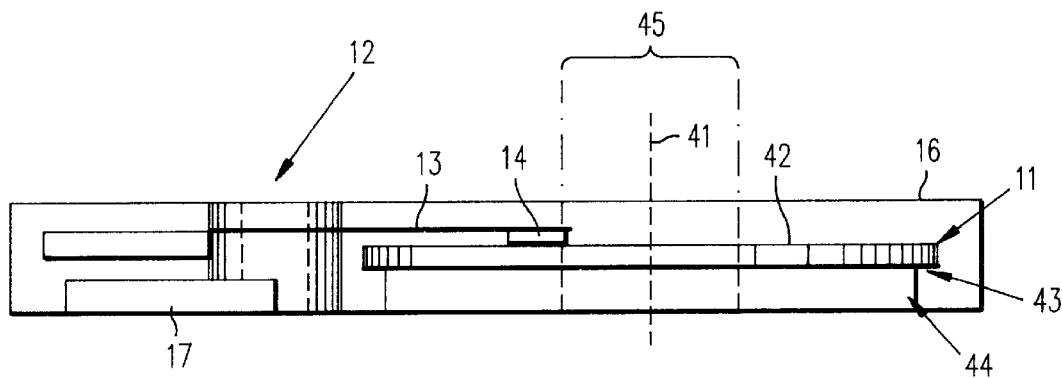
FIGS. 3(a)–3(d) show side and top views of the component disk drive for use in the preferred embodiment of the present invention.
Figure 3B:
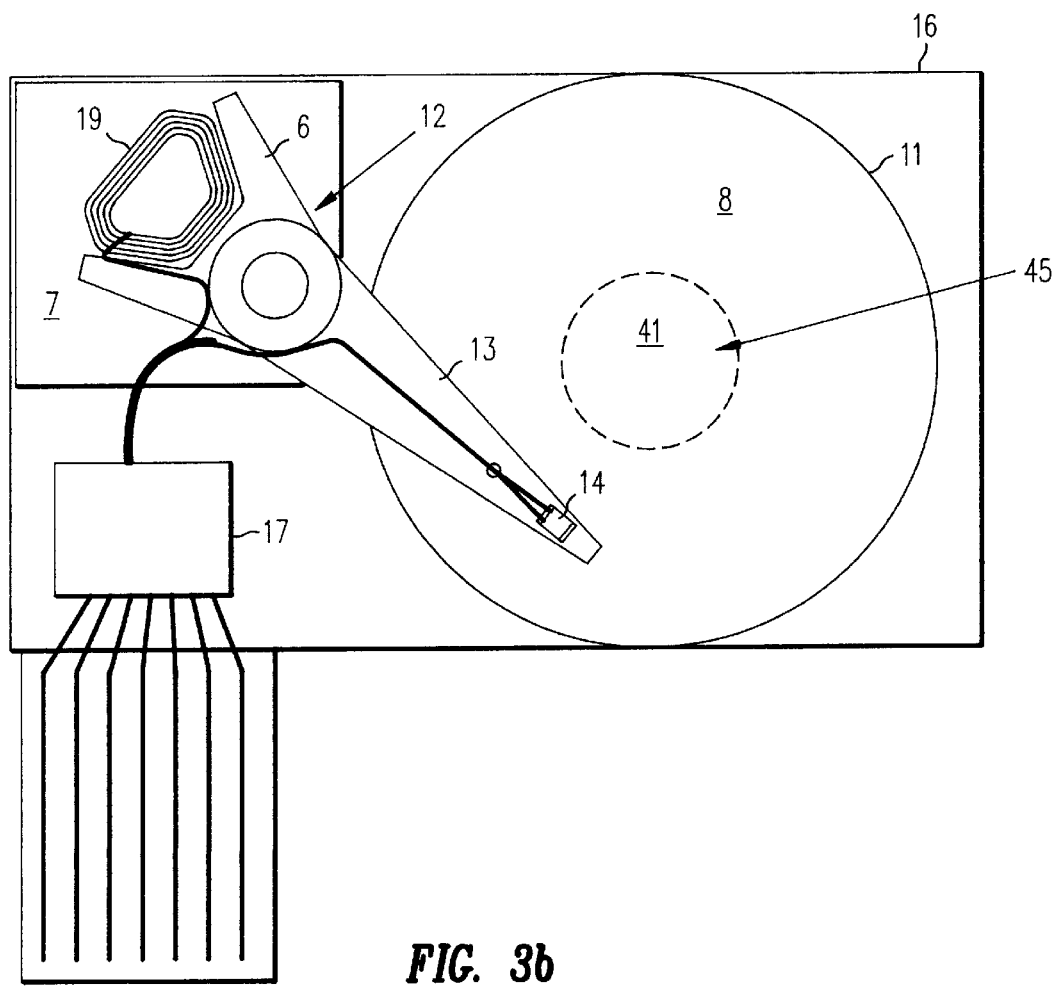
Figure 3C:
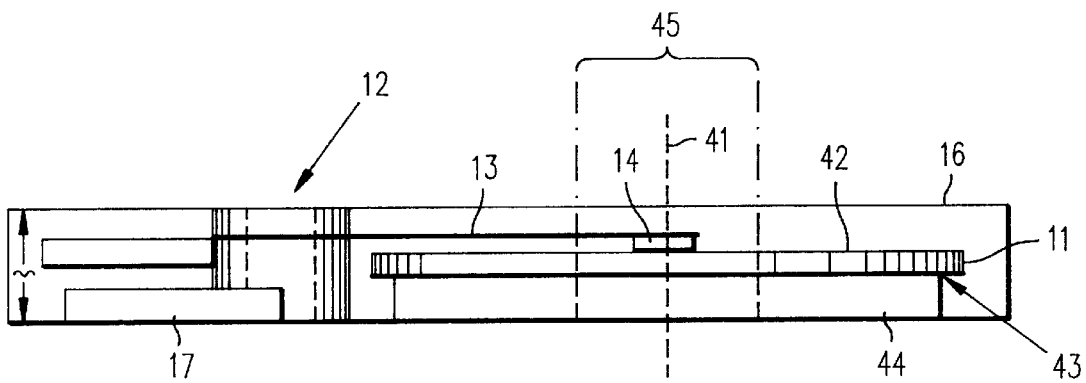
Figure 3D:
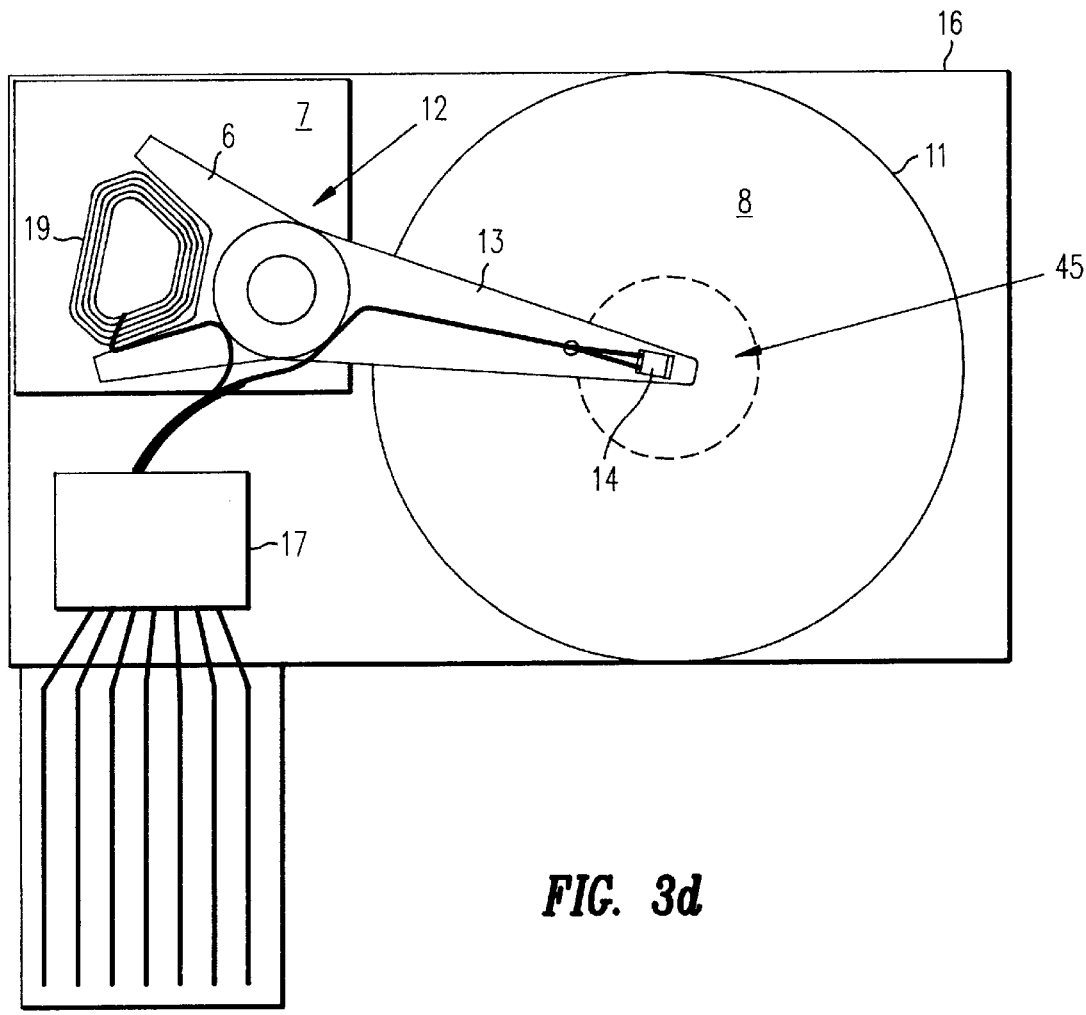

Direct mounting of disk 11 to motor 44 creates an unobstructed region 45 at the disk's center 41 accessible to the actuator assembly 12. The diameter of recording tracks in this region would be too small for practical use, so the region is used for center parking. FIGS. 3(a) and 3(b) show head 14 and suspension 13 positioned over the data recording surface of disk 11. During times of inactivity, the head is "parked" in the central region 45 as shown in FIGS. 3(c) and 3(d) so that head 14 is substantially aligned with a central axis 41 perpendicular to the disk surface. As the slider 14 nears the inner diameter of the disk 11, the upward force of the air flow is reduced and the slider begins to drag along region 45. It is then "parked" at the disk center 41 as shown. Parking structures, e.g. ramps, may be added to the center parking region to facilitate parking. Spacer structures may also be provided between this region and the upper drive housing for added structural support.

The actuator assembly 12 moves the slider back onto the disk surface when necessary by applying a force to overcome the stiction between slider 14 and surface 8. "Stiction" is a term of art for the attractive and frictional forces between slider 14 and surface 8. It is greatest at the outer diameter of the disk and decreases in the direction of the disk center, being essentially reduced to zero at dead center. Since the slider is parked at disk center 41, stiction is virtually nonexistent, and very little force is required to overcome it.

The slider 14 is preferably also center parked during periods when the drive is not operational. When the drive is powered on, the disk 11 spins without any significant stiction impedance. Reduced stiction translates to a reduction in starting torque required from the motor 44. Reduced starting torque in turn leads to a reduction in the electric power requirements of the drive.

As mentioned previously, the preferred embodiment of the component disk drive allows a flatter, wider motor 44 to be used than conventional disk drives requiring hubs. The motor may take a variety of forms. For example, it may be fixed to the disk drive housing or integrated therein. It may have the shape of a disk, or be annular in shape. It may include a hub, and the disk may be mounted directly to the hub, or alternatively, the hub may penetrate the disk and lie substantially flush with the recording surface to preserve actuator access for center parking. An annular motor may surround a stationary hub structure that lies flush with the recording surface to provide a stationary parking zone at disk center.

Those skilled in the art of motor design generally understand that an increase in the diameter of the motor windings increases its moment arm to generate more torque with less force. The motor thus requires less electric current to perform the same operation as a center hub motor. Since the electrical power (P) is proportional to the square of the current, a reduction in the current requirement will result in a large reduction in the electric power requirement as shown below.

$$P = I \times I \times R, \quad (1)$$

and $$I = k/D \quad (2).$$

Therefore, $$P = (k \times k \times R)/(D \times D) \quad (3),$$

where P is the electric power of the motor, I is the electric current used by the motor, D is the motor diameter, R is the electric resistance of the motor, and k is the inversely proportional constant of the motor current to diameter. Applying the above equations, an increase of motor diameter by, for example, a factor of 3 will result in a motor that can achieve the same torque with ⅑th of the power. The motor torque is transmitted directly to the bottom surface of the disk through, for example, an adhesive or a coupling device. Examples of motors that may be used to implement the preferred embodiment include those implemented in the commercially available IBM Travelstar, and the Maxtor MobileMax Lite.

Figure 4:
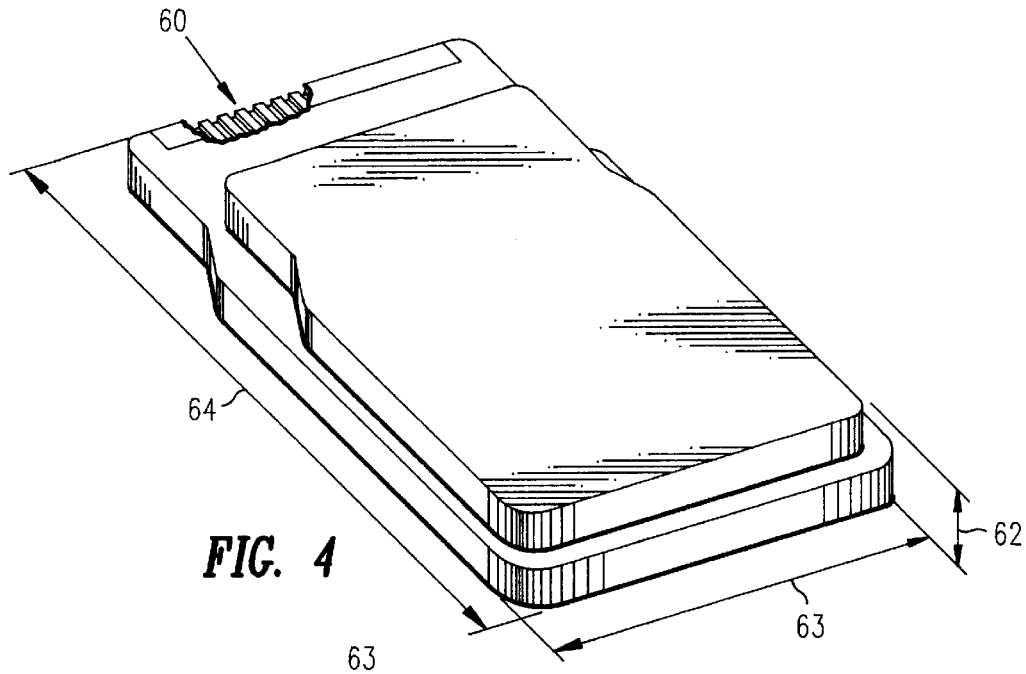
FIG. 4 is a perspective view of a general card-type electronic circuit enclosure.

FIG. 4 is representative of a card enclosure for an electronic circuit, adapted to be plugged into a compatible computer slot at connector 64. It may, for example, be a PCMCIA card type I, II or III having a predefined length 64, width 63, and height 62. The card thickness 62 is generally the most critical dimension of a card enclosure.

Figure 5:
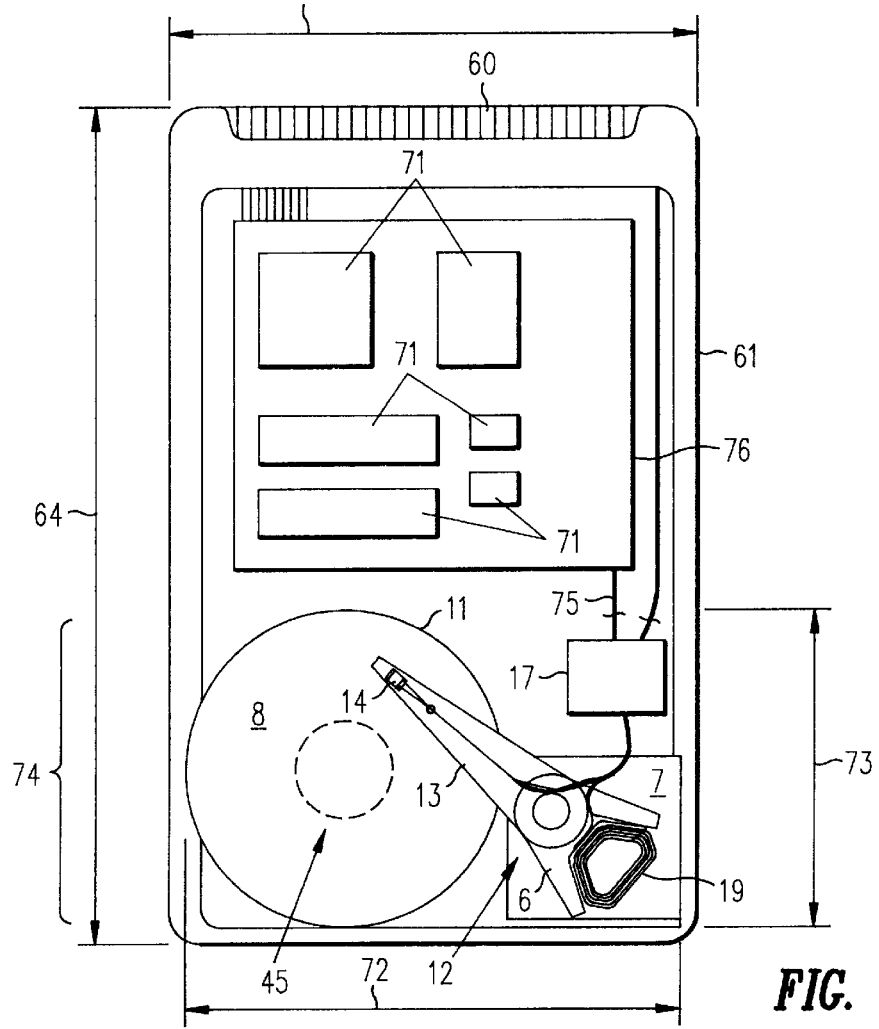
FIG. 5 is a top exposed view of a card enclosure housing an electronic circuit that includes a component disk drive for local storage requirements according to the present invention.

FIG. 5 illustrates generally the preferred embodiment of the electronic circuit apparatus of the present invention. The circuit implements a discrete, component sized disk drive 74 for local storage and resides in a card enclosure such as a PCMCIA type II or type III format, although it will be understood that the circuit apparatus of the present invention may also be enclosed in other card formats, or may comprise the electronic circuit of an electronic device and reside within the device enclosure rather than within a card enclosure (e.g. a camera). The disk drive assembly 74 preferably measures no more than 2 inches in length 72×1.6 inches in width 73×5 mm in height.

For example, a 1.3" magnetic disk is mounted to a small, flat motor such as that implemented in Maxtor's MobileMax Lite. (At present there are no flat motors under 5 mm commercially available for implementation in a type II design. However, availability is anticipated in the near future and prototypes are currently being tested.) The actuator assembly is a conventional dual-suspension design such as that used in the Hewlett Packard KITTYHAWK 1.3" drive, modified to have a single suspension with a magnetoresistive head. Modifications required for operability include removal of the lower suspension and any actuator arm height adjustments necessitated by the height of the direct-mounted disk. It may also be desirable to make additional modifications, e.g. reducing the height of the actuator assembly. The manner of making such modifications will be readily apparent to a person of ordinary skill in the operation of disk drive assemblies in view of this specification and the state of the art.

The disk drive assembly 74 preferably occupies less than 50% of the available card area and has an orientation such as that shown. Alternatively, the drive is oriented such that its length 72 is parallel to the length 64 of the card. The remaining card area is populated by a plurality of electronic components 71 comprising an application subcircuit.

The control functions required to control operation of the drive preferably reside on one or more of the integrated circuit (IC) components 71 within the card enclosure. As those skilled in the art will appreciate, the control electronics include functions such as servo control, an interface, data, address and command buffers, drive motor controls, and a read/write channel. Since the component disk drive is small, the control electronics will be in close proximity to the drive itself. It may therefore also be desirable to include the arm electronics 17 within the control electronics rather than within the disk drive enclosure. The circuit components embodying the control electronics may be dedicated to storage control, or may additionally include non-storage functions. For circuits housed in non-PCMCIA card formats, it may be desirable to locate the storage control components external to the card, e.g. within the electronic device into which the card is plugged.

Referring back to FIG. 5, subcircuit components 71 are mounted to an electronic circuit board 76 occupying the portion of the card unoccupied by the device assembly 74. Conductive means 75, e.g. a flex cable or other connector, couples the drive assembly to the circuit components 71. The conductive means 75 include, for example, control lines, a data bus, and an address bus. If the components controlling the operation of the drive are external to the card enclosure, the appropriate control lines are routed to connector 60 to provide external access to the assembly 74, as shown.

The drive assembly 74 is preferably enclosed in a separate housing (not shown) within the card enclosure isolating it from the other components for protection against contaminants. Alternatively, the card may be subdivided into two or more isolated sections, or card production may be carefully controlled to minimize the presence of contaminants in the entire card.

Numerous types of electronic devices currently include electronic circuits that use solid state memory for local storage requirements. All of these are viable candidates for implementing a component disk drive in lieu of memory according to the electronic circuit apparatus of the present invention, including, for example, fax machines, cellular phones, printers, cameras, appliances, and portable computing devices.

Figure 6:
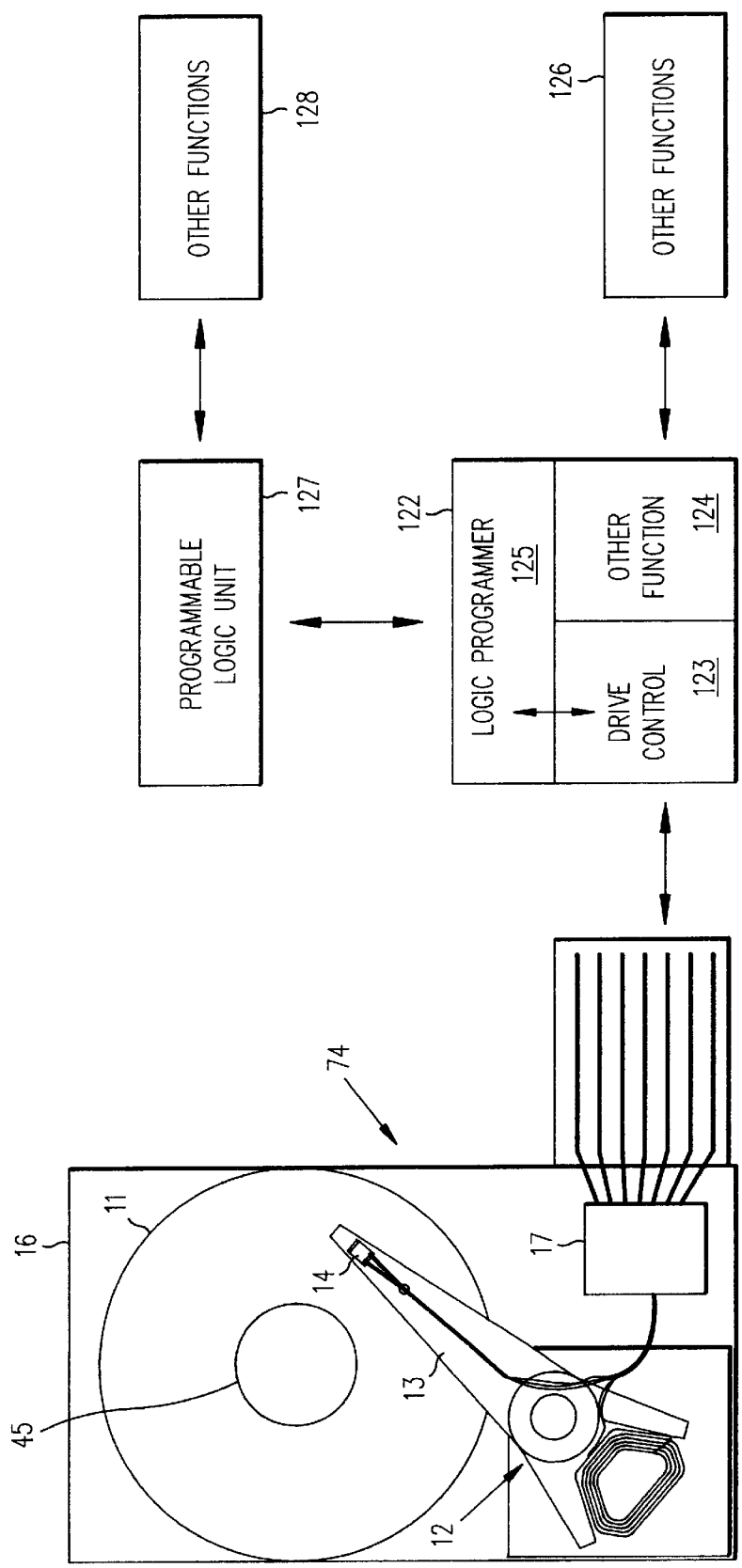
FIG. 6 is a functional block diagram illustrating a specific embodiment of an electronic circuit apparatus according to the present invention.

FIG. 6 is a functional diagram of an electronic circuit apparatus according to the present invention wherein the component disk drive 74 is used for storing microcode. The circuit includes a programmable logic unit (PLU) 127 for performing one or more desired functions which are defined by one or more microcode sets. The PLU may, for example, be programmable array logic (PAL), a programmable logic device (PLD), or a microprocessor with programmable functions. Each microcode set corresponds to a unique PLU function. The PLU 127 typically is linked to one or more non-storage related circuit components 128 and may function, for example, as a disk interface between the components 128 and the disk drive 74, as a microprocessor, or as an arithmetic device. The microcode sets are stored locally, i.e. in the component disk drive 74, and then programmed into the unit 127 via a logic programmer 125. Since information on a disk drive is easily updated, additions, deletions, and other modifications may readily be made to the microcode sets.

The component drive 74 is linked to drive control electronics 123. In the interest of conserving space, the drive control electronics are merged with logic programmer 125 into a controller device 122 such as a solid state component, die, multi-chip module, or electronic assembly. The controller 122 optionally includes other functions 124 unrelated to drive control and PLU programming that may require further links to one or more additional circuit components 126.

Figure 7:
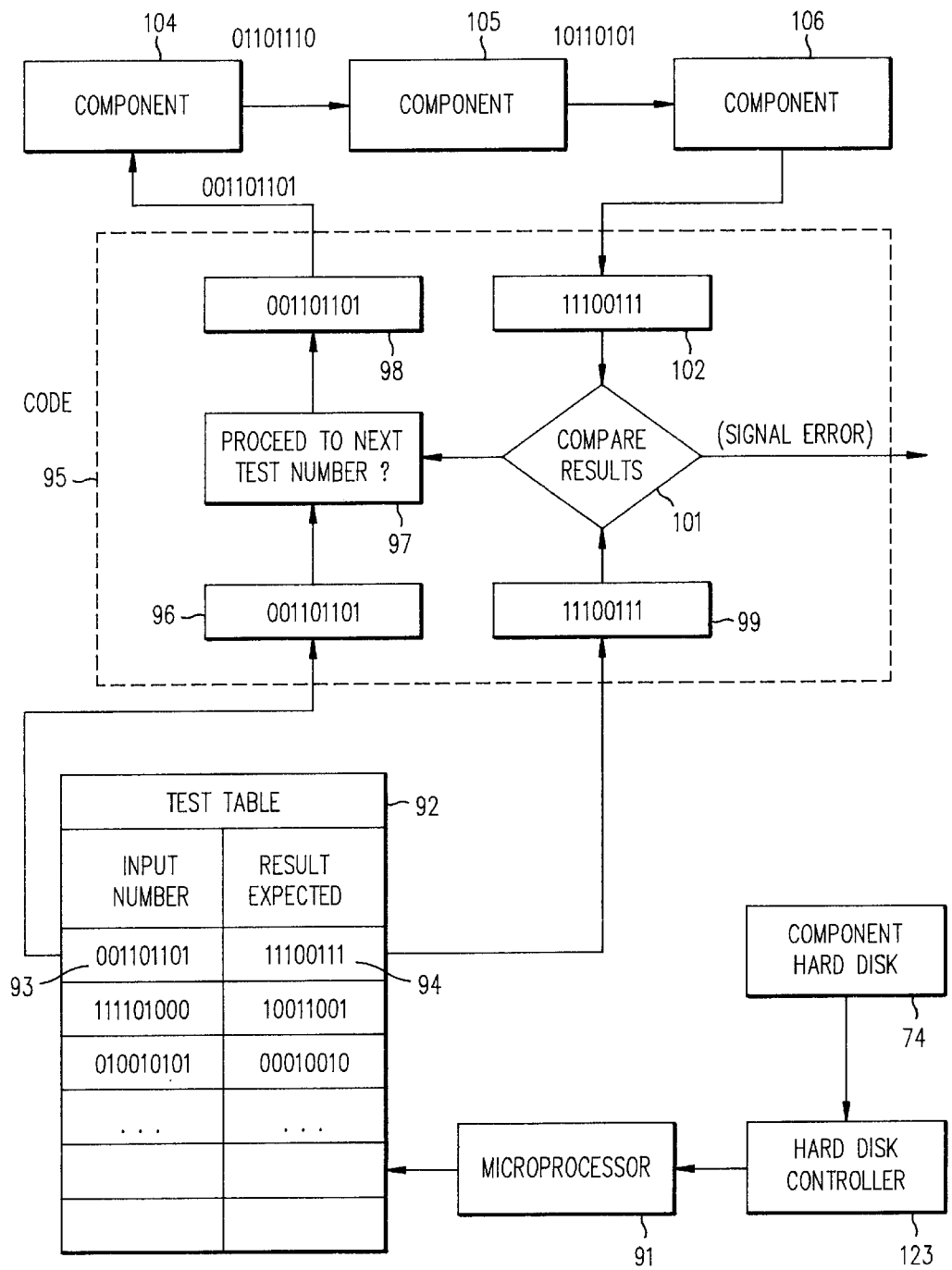
FIG. 7 is a functional block diagram illustrating another specific embodiment of the circuit apparatus according to the present invention.

FIG. 7 shows another specific embodiment of the present invention, wherein the component disk drive 74 stores basic assurance test (BAT) code and tables. As described earlier, BAT code typically resides in EPROM or flash memory, and runs diagnostic tests against components of the circuit to verify their operability. Verification testing is a desirable feature for card-based applications and electronic devices in general to assure their reliability.

Referring to FIG. 7, a component disk drive 74 and its associated drive electronics 123 are linked to a microprocessor 91 which initiates execution of the BATs. The microprocessor is linked to high speed static ram (SRAM) 92, which, in turn, is linked to test circuitry 95. The test circuitry is part of a circuit loop including the circuit components 104–106 to be tested.

When the processor 91 is in test mode, it receives test microcode from component drive 74, including a table of test patterns that are loaded into SRAM 92. The table includes a plurality of binary input test patterns 93 and their corresponding results 94 expected from a properly working circuit. The next test pattern to be executed and its corresponding expected result are provided to the test circuit, e.g. by loading them into input buffers 96, 99. The test pattern is then forwarded to the components under test, e.g. via an output buffer 98, unless an error signal has been detected by control means 97. Buffers 96 and 98 may actually comprise a series of n latches, where n is the number of bits in the test pattern, and the control means 97 may comprise an inverted error signal coupled to the clock inputs of these latches.

Assuming no error, the next sequential test pattern is loaded into input buffer 96 and the current test pattern is passed through the circuit components 104–106. Each component under test receives the pattern and performs its particular function upon it. The final result is then returned to the test circuitry 95, e.g. into input buffer 102. Comparing means 101 such as a comparator then compares the result in buffer 102 with the expected result in buffer 99. If a mismatch occurs, an error signal is generated and propagated to control means 97 to halt execution of the next pattern in the test sequence. It is also provided to error handling functions (not shown), such as retry circuitry, error indicator means or shutdown means. If a mismatch has not occurred, the next test pattern is passed to the circuit components and the preceding steps are repeated until an error is detected or the test sequence is completed. The functions of test circuit 95 may alternatively be performed by a computer program stored in the component drive 74 and executed by the processor 91.

Another use for a component disk drive is for storing user information. A component drive may be used, for instance, to store telephone numbers, messages, and similar information in any type of portable wireless messaging device.

State-of-the art portable message devices that rely on solid state memories are limited in the amount of information they can store, making them impractical for receiving large documents, electronic mail, pictures and video images. This limitation is overcome by replacing the memory with a component disk drive.

Figure 8:
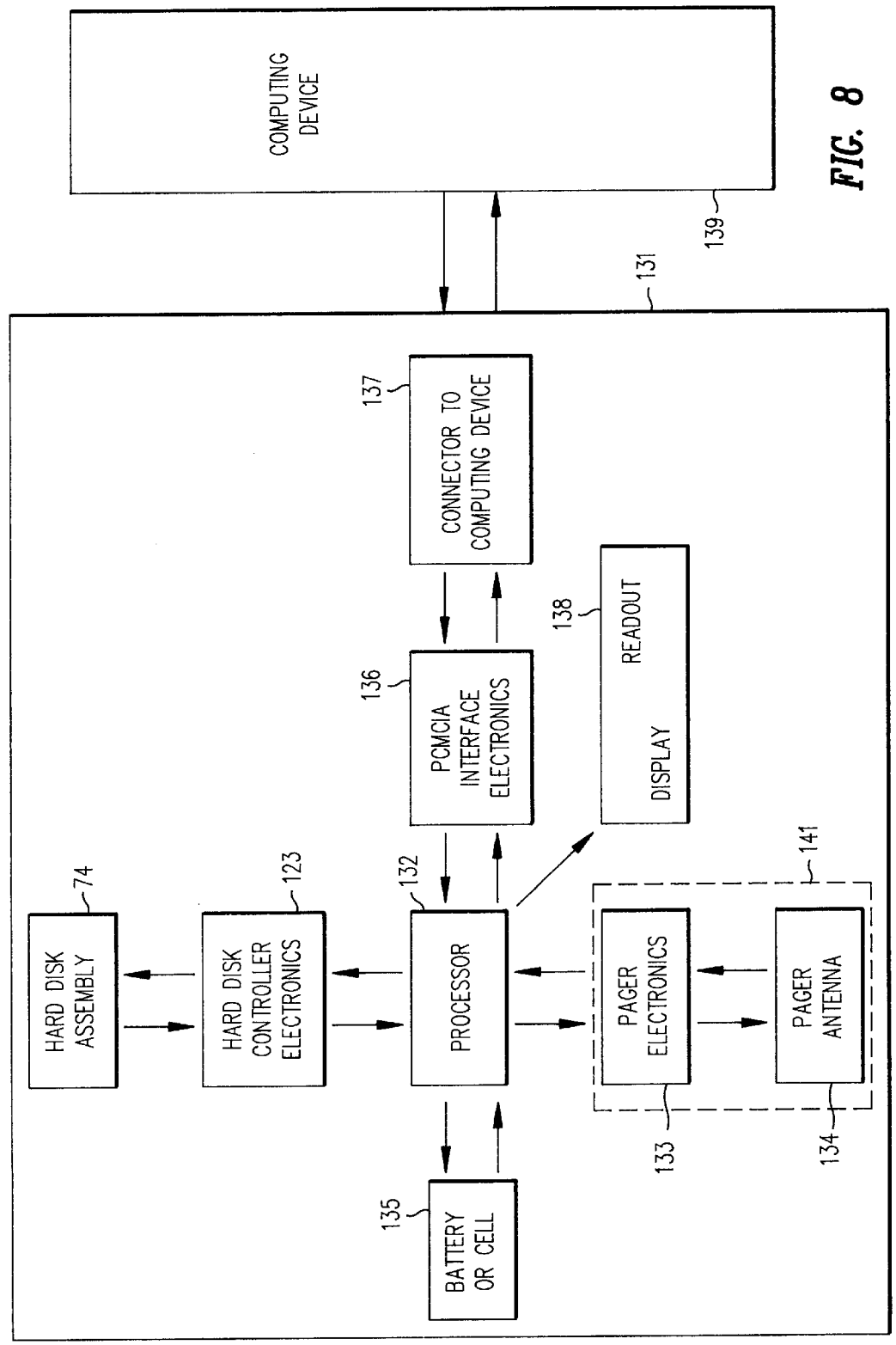
FIG. 8 is a functional block diagram illustrating a further embodiment of the circuit apparatus according to the present invention.

FIG. 8 shows a functional diagram of an electronic circuit apparatus 131 according to the present invention that operates as an electronic pager, wherein a component disk drive 74 provides resident storage for telephone numbers, messages, and other user information. The device is packaged as a peripheral device, e.g. in a PCMCIA card format, or in an independent device packaged conveniently for handheld manipulation.

The pager apparatus 131 of FIG. 8 includes an electronic circuit typical of a conventional digital pager. A processor 132 controls the operation of the device. The processor 132 is coupled to a frequency monitoring wireless receiver circuit 141 comprising, for example, an antenna 134 and receiver electronics 133. The circuit also includes some type of readout display 138, e.g. an LCD display. If the pager is packaged as a peripheral device, it further comprises means for communicating with a computing device 139, e.g. PCM-CIA interface electronics 136 disposed between the processor 132 and the card connector 137.

In operation, the wireless receiver circuit 141 "listens" on a predetermined frequency for a particular code or signal indicating a message is to be transmitted. In listening mode, the component drive 74 is powered down to conserve energy. Upon detecting the proper code, the receiver electronics 133 signals the processor 132 to power up to the component drive 74. The receiver circuit 141 then receives the message in the form of electromagnetic radiation and converts it to digital electric impulses. These, in turn, are transmitted via the processor 132 to the drive electronics 123 and are stored magnetically on the component drive 74. Once the message is received, the display 138 may display the message or post a notice that a message has been received. Then the drive 74 is again powered down, and the circuit returns to a listening mode.

The pager circuit just described is capable of storing lengthy messages. For independent devices, this would necessitates a reasonably large display means. Alternatively, if the device is implemented as a peripheral, messages can be stored away for later access. The user then displays his messages by plugging the device 131 into a computing device 139, e.g. a laptop computer. The computing device accesses the information on the component drive 74 and displays it on a monitor (not shown).

Since the component drive of the pager implementation of FIG. 8 is powered down much of the time, energy consumption of the unit is relatively low. Consequently, the circuit may be powered by an independent power source, such as a battery pack 135. Alternatively, or in addition, it may rely on a power supply (not shown) in computing device 139.

A peripheral pager can be carried much like a digital pager, using it's batteries to power up the component drive when necessary. Since messages are immediately received and available for access, the user is no longer required to place a phone call to obtain the information. Standard encryption techniques are preferably employed for security to assure the security of the information. In addition, the device preferably further comprises a wireless transmitter (not shown) for return communication. Information to be transmitted is entered into the computing device 139 and downloaded into the component drive. It may then be transmitted immediately, or at a later time.

Although the electronic circuit apparatus of the present invention has been described in terms of specific embodiments, it is to be understood that this disclosure is not to be interpreted as limited to those embodiments shown. Various further alterations and modifications will no doubt become apparent to those skilled in the art after having read the above disclosure. Moreover, the examples provided are not intended to be exhaustive, and the scope of the present invention defined by the following claims is intended to extend to all functional equivalents of the elements shown or described.

I claim:

1. An apparatus comprising:
    an electronic circuit board;
    an electronic circuit mounted on said circuit board, said electronic circuit including a programmable logic unit (PLU);
    a component disk drive mounted on said circuit board and coupled to said electronic circuit, said component disk drive configured to store microcode for programming said PLU; and
    a logic programmer device mounted on said electronic circuit board and coupled to said PLU.

2. The apparatus of claim 1, further comprising a disk drive controller mounted on said electronic circuit board and coupled to said component disk drive.

3. The apparatus of claim 2, wherein said logic programmer device and said disk controller represent a single electronic component.

4. The apparatus of claim 2, wherein said disk drive controller resides within said component disk drive.

5. The apparatus of claim 1, wherein said electronic circuit apparatus resides in a card enclosure adapted for plugging into a computer slot.

6. The apparatus of claim 5, wherein said card further comprises a PCMCIA type II card.

7. The apparatus of claim 5, wherein said card further comprises a PCMCIA type III card.

8. The apparatus of claim 5, wherein said component disk drive occupies not more than 50% of said card enclosure.

9. The apparatus of claim 1, wherein said component disk drive further comprises:
    a disk having one recording surface;
    means for rotating said disk;
    means for writing information to said one recording surface; and
    means for selectively retrieving a portion of said information from said recording surface.

10. The apparatus of claim 9, wherein said component disk drive further comprises a substantially planar region at the center of said recording surface, a transducer for writing to and retrieving information from said recording surface, and means for parking said transducer on said substantially planar region.

11. The apparatus of claim 9, wherein the diameter of said disk is not greater than 1.3 inches.

12. The apparatus of claim 9, wherein said disk further comprises a magnetic disk.

13. The apparatus of claim 9, wherein said means for rotating said disk further comprises a round, flat magnet having a diameter greater than half the diameter of said disk, and wherein said disk is directly mounted on said magnet.

14. The apparatus of claim 9, wherein said means for rotating said disk comprises an annular motor.

15. The apparatus of claim 14, further comprising a stationary structure disposed in the center of said motor, wherein a portion of said stationary structure passes through said disk and is flush with said recording surface to provide a substantially planar region at the center of said recording surface.

16. The apparatus of claim 9, wherein said means for rotating said disk further comprises a motor including a hub passing through the center of said disk and flush with said recording surface to provide a substantially planar region at the center of said recording surface.

17. An apparatus comprising:
    an electronic circuit board;
    an electronic circuit mounted on said circuit board, said electronic circuit including a plurality of electronic components;
    a component disk drive mounted on said circuit board and coupled to said electronic circuit, said component disk drive configured to store diagnostic test information for testing at least one of said electronic components; and
    means for testing said electronic circuit using said diagnostic test information.

18. The apparatus of claim 17, wherein said component disk drive includes a table of input bit patterns and corresponding expected result bit patterns for performing a basic assurance test.

19. The apparatus of claim 18, wherein said testing means comprises:
  means for providing each of said input bit patterns to said electronic circuit;
  means for receiving an output bit pattern generated by said electronic circuit in response to said input bit pattern;
  means for comparing said output bit pattern with said expected result bit pattern corresponding to said input bit pattern; and
  means for generating an error signal in response to a miscompare of said output bit pattern and said expected result pattern.

20. The apparatus of claim 19, wherein said testing means further comprises means responsive to said error signal for halting said basic assurance test.

21. The apparatus of claim 19, wherein said testing means further comprises an electronic subcircuit in said electronic circuit apparatus.

22. The apparatus of claim 19, further comprising a solid state memory component and means for temporarily loading said table into said solid state memory component for access by said testing means.

23. The apparatus of claim 17, wherein said apparatus resides in a card enclosure adapted for plugging into a computer slot.

24. The apparatus of claim 23, wherein said card further comprises a PCMCIA type II card.

25. The apparatus of claim 23, wherein said card further comprises a PCMCIA type III card.

26. The apparatus of claim 23, wherein said component disk drive occupies not more than 50% of said card enclosure.

27. The apparatus of claim 17, wherein said component disk drive further comprises:
  a disk having one recording surface;
  means for rotating said disk;
  means for writing information to said one recording surface; and
  means for selectively retrieving a portion of said information from said recording surface.

28. The apparatus of claim 27, wherein said component disk drive further comprises a substantially planar region at the center of said recording surface, a transducer for writing to and retrieving information from said recording surface, and means for parking said transducer on said substantially planar region.

29. The apparatus of claim 27, wherein the diameter of said disk is not greater than 1.3 inches.

30. The apparatus of claim 27, wherein said disk further comprises a magnetic disk.

31. The apparatus of claim 27, wherein said means for rotating said disk further comprises a round, flat magnet having a diameter greater than half the diameter of said disk, and wherein said disk is directly mounted on said magnet.

32. The apparatus of claim 27, wherein said means for rotating said disk comprises an annular motor.

33. The apparatus of claim 32, further comprising a stationary structure disposed in the center of said motor, wherein a portion of said stationary structure passes through said disk and is flush with said recording surface to provide a substantially planar region at the center of said recording surface.

34. The apparatus of claim 27, wherein said means for rotating said disk further comprises a motor with a hub passing through the center of said disk and flush with said recording surface to provide a substantially planar region at the center of said recording surface.

35. The apparatus of claim 27, wherein said means for providing said BAT to said testing means further comprises a disk drive controller.

36. An apparatus comprising:
  an electronic circuit board;
  an electronic circuit mounted on said electronic circuit board, said electronic circuit including a receiver circuit configured to receive messages in the form electromagnetic signals and to convert said electromagnetic signals into electronic signals; and
  a component disk drive mounted on said electronic circuit board and coupled to said electronic circuit, said component disk drive configured to store said messages;
  wherein said component disk drive includes a hard disk assembly and drive electronics.

37. The apparatus of claim 36, further comprising a processor mounted on said electronic circuit board and coupled between said component disk drive and said receiver circuit, said processor configured to power up said component disk drive in response to a power-up signal.

38. The apparatus of claim 37, further comprising a battery coupled to said processor.

39. The apparatus of claim 37, wherein said electronic circuit further comprises a transmitting device configured to transmit information stored in said component disk drive.

40. The apparatus of claim 39, wherein said electronic circuit further comprising an interface circuit, wherein said interface circuit receives said information from an external computing device and provides said information to said processor for downloading into said component disk drive.

41. The apparatus of claim 36, wherein said apparatus resides in a card enclosure adapted for plugging into a computer slot.

42. The apparatus of claim 41, wherein said card further comprises a PCMCIA type II card.

43. The apparatus of claim 41, wherein said card further comprises a PCMCIA type III card.

44. The apparatus of claim 41, wherein said component disk drive occupies not more than 50% of said card enclosure.

45. The apparatus of claim 36, wherein said component disk drive further comprises:
  a disk having one recording surface;
  means for rotating said disk;
  means for writing information to said one recording surface; and
  means for selectively retrieving a portion of said information from said recording surface.

46. The apparatus of claim 45, wherein said component disk drive further comprises a substantially planar region at the center of said recording surface, a transducer for writing to and retrieving information from said recording surface, and means for parking said transducer on said substantially planar region.

47. The apparatus of claim 45, wherein the diameter of said disk is not greater than 1.3 inches.

48. The apparatus of claim 45, wherein said disk further comprises a magnetic disk.

49. The apparatus of claim 45, wherein said means for rotating said disk further comprises a round, flat magnet having a diameter greater than half the diameter of said disk, and wherein said disk is directly mounted on said magnet.

50. The apparatus of claim 45, wherein said means for rotating said disk comprises an annular motor.

51. The apparatus of claim 50, further comprising a stationary structure disposed in the center of said motor, wherein a portion of said stationary structure passes through said disk and is flush with said recording surface to provide a substantially planar region at the center of said recording surface.

52. The apparatus of claim 45, wherein said means for rotating said disk further comprises a motor with a hub passing through the center of said disk and flush with said recording surface to provide a substantially planar region at the center of said recording surface.

53. The apparatus of claim 45, wherein said means for providing said received messages to said component disk drive further comprises a disk drive controller.

54. The apparatus of claim 1 wherein said PLU comprises a microprocessor.

55. The apparatus of claim 1 wherein said PLU comprises an arithmetic unit.

* * * * *